(12) United States Patent
Jaradi et al.

(10) Patent No.: US 12,043,205 B2
(45) Date of Patent: Jul. 23, 2024

(54) AIRBAG ASSEMBLY FOR RECLINED VEHICLE OCCUPANT

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 17/747,439

(22) Filed: May 18, 2022

(65) Prior Publication Data

US 2023/0373432 A1   Nov. 23, 2023

(51) Int. Cl.
*B60R 22/14* (2006.01)
*B60R 21/00* (2006.01)
*B60R 21/16* (2006.01)
*B60R 21/2338* (2011.01)

(52) U.S. Cl.
CPC .............. *B60R 22/14* (2013.01); *B60R 21/16* (2013.01); *B60R 2021/0034* (2013.01); *B60R 2021/23386* (2013.01)

(58) Field of Classification Search
CPC .......... B60R 21/16; B60R 2021/23386; B60R 2021/0034; B60R 22/14; B60R 2021/161; B60R 2021/23146
See application file for complete search history.

(56) References Cited

U.S. PATENT DOCUMENTS

| 3,648,306 | A  | * | 3/1972  | Auerbach  | B60N 2/2854 |
|           |    |   |         |           | 5/118 |
| 3,696,449 | A  | * | 10/1972 | Smith     | A47D 13/063 |
|           |    |   |         |           | 5/118 |
| 6,142,521 | A  |   | 11/2000 | Shephard  | |
| 6,367,839 | B1 | * | 4/2002  | Langhoff  | B60R 22/28 |
|           |    |   |         |           | 5/118 |
| 6,612,606 | B1 | * | 9/2003  | Bergenheim | B60R 21/16 |
|           |    |   |         |           | 5/118 |

(Continued)

FOREIGN PATENT DOCUMENTS

DE   102014213301 A1   1/2016
DE   102018206090 A1   10/2019

(Continued)

*Primary Examiner* — Milton Nelson, Jr.
(74) *Attorney, Agent, or Firm* — Frank A. MacKenzie; Bejin Bieneman PLC (57) ABSTRACT

An assembly for a vehicle includes a vehicle bed elongated along an axis. The bed includes a first side and a second side with the axis between the first side and the second side. A first end and a second end are spaced from each other along the axis. The assembly includes a first airbag elongated along the axis on the first side of the bed and inflatable to an inflated position and a second airbag elongated along the axis on the second side of the bed and inflatable to an inflated position. An airbag extension is supported by the first airbag in the inflated position and abuts the second airbag in the inflated position. The assembly includes a tether extending from the first airbag to the second airbag. The tether abuts the airbag extension. The airbag extension is between the tether and the second end of the vehicle bed.

15 Claims, 7 Drawing Sheets

(56) References Cited

U.S. PATENT DOCUMENTS

| | | |
|---|---|---|
| 7,264,275 B2 | 9/2007 | Wang et al. |
| 7,677,598 B1 | 3/2010 | Ryan et al. |
| 9,744,932 B1 | 8/2017 | Faruque et al. |
| 10,343,642 B2 | 7/2019 | Faruque et al. |
| 11,040,689 B2 * | 6/2021 | Lin ................... B60R 21/01554 |
| 11,161,471 B2 | 11/2021 | Fukawatase |
| 11,390,235 B2 * | 7/2022 | Kim ................... B60R 21/2338 |
| 2006/0249944 A1 | 11/2006 | Jessup et al. |
| 2009/0001695 A1 | 1/2009 | Suzuki et al. |
| 2023/0373431 A1 * | 11/2023 | Farooq ................. B60R 21/231 |

FOREIGN PATENT DOCUMENTS

| | | |
|---|---|---|
| DE | 102018206093 A1 | 10/2019 |
| DE | 102018206094 A1 | 10/2019 |
| DE | 102019201300 * | 8/2020 |
| DE | 102019118840 A1 | 1/2021 |
| DE | 102020101509 A1 | 7/2021 |

\* cited by examiner

AIRBAG ASSEMBLY FOR RECLINED VEHICLE OCCUPANT

BACKGROUND

A vehicle body defines a passenger compartment to house occupants of the vehicle. The vehicle typically includes a plurality of beds in the passenger cabin. The beds may be arranged in the passenger compartment in any suitable position, i.e., as front beds, rear beds, second-row beds, third-row beds, etc. While all modern OEMs of passenger vehicles currently warn occupants against not sitting upright in a moving vehicle due to safety concerns, it is anticipated that technology and the regulatory framework may evolve in the future to where such an activity is safe and permissible.

BRIEF DESCRIPTION OF THE DRAWINGS

FIG. 1 is a perspective view of a vehicle including two reclined vehicle beds. While all modern OEMs of passenger vehicles currently warn occupants against not sitting upright in a moving vehicle while the vehicle is moving due to safety concerns, it is anticipated that technology and the regulatory framework may evolve in the future to where such an activity is safe and permissible and FIG. 1 shows one such example

DETAILED DESCRIPTION

An assembly includes a vehicle bed elongated along an axis. The vehicle bed includes a first side and a second side with the axis between the first side and the second side. The vehicle bed has a first end and a second end spaced from each other along the axis. A first airbag is elongated along the axis on the first side of the vehicle bed and inflatable to an inflated position. A second airbag is elongated along the axis on the second side of the vehicle bed and is inflatable to an inflated position. An airbag extension is supported by the first airbag in the inflated position and abuts the second airbag in the inflated position. A tether extends from the first airbag to the second airbag. The tether abuts the airbag extension. The airbag extension is between the tether and the second end of the vehicle bed.

The first airbag may have an inflation chamber and the airbag extension may have an inflation chamber open to the inflation chamber of the first airbag.

The tether may be connected to the first airbag and the second airbag.

The assembly may include a second airbag extension supported by the first airbag in the inflated position and abutting the second airbag in the inflated position. The second airbag extension may be spaced from the airbag extension along the axis. The assembly may include a second tether extending from the first airbag to the second airbag. The second airbag extension may be between the second tether and the first end of the vehicle bed. The first airbag has an inflation chamber, the airbag extension has an inflation chamber open to the inflation chamber of the first airbag, and the second airbag extension has an inflation chamber open to the inflation chamber of the first airbag. The tether and the second tether may be connected to the first airbag and the second airbag.

The assembly may include at least one belt restraint extendable from the first side of the vehicle bed to the second side of the vehicle bed.

The assembly may include a second vehicle bed elongated along a second axis, the second airbag being between the vehicle bed and the second vehicle bed. The assembly may include a third airbag elongated along the second axis and inflatable to an inflated position, the second vehicle bed including a first side and a second side with the second axis between the first side of the second vehicle bed and the second side of the second vehicle bed. The second axis of the second vehicle bed may be parallel to the axis of the vehicle bed. The assembly may include a third airbag extension supported by the third airbag in the inflated position and abutting the second airbag in the inflated position. The assembly may include a third tether extending from the third airbag to the second airbag, the third tether abutting the third airbag extension. The second vehicle bed may have a first end and a second end spaced from each other along the second axis, the third airbag extension being between the third tether and the second end of the second vehicle bed. The assembly may include a fourth airbag extension supported by the third airbag in the inflated position and abutting the second airbag in the inflated position, the fourth airbag extension being spaced from the third airbag extension along the second axis. The assembly may include a fourth tether extending from the third airbag to the second airbag, the fourth airbag extension being between the fourth tether and the first end of the second vehicle bed. The assembly may include a second airbag extension supported by the first airbag in the inflated position and abutting the second airbag in the inflated position, the second airbag extension being spaced from the airbag extension along the axis. The assembly may include a second tether extending from the first airbag to the second airbag, the second airbag extension being between the second tether and the first end of the vehicle bed. The first airbag may have an inflation chamber, the airbag extension may have an inflation chamber open to the inflation chamber of the first airbag, and the second airbag extension may have an inflation chamber open to the inflation chamber of the first airbag. The third airbag may have an inflation chamber, the third airbag extension may have an inflation chamber open to the inflation chamber of the third airbag, and the fourth airbag extension may have an inflation chamber open to the inflation chamber of the third airbag.

With reference to the figures, wherein like numerals indicate like parts throughout the several views, an assembly 10 for a vehicle 12 includes a vehicle bed 14 (hereinafter referred to as "bed 14"). The bed 14 is elongated along an axis A. The bed 14 includes a first side 16 and a second side 18 with the axis A between the first side 16 and the second side 18. The bed 14 includes a first end 20 and a second end 22 spaced from each other along the axis A. The assembly includes a first airbag 24 elongated along the axis A on the first side 16 of the bed 14 and inflatable to an inflated position and a second airbag 26 elongated along the axis A on the second side 18 of the bed 14 and inflatable to an inflated position. An airbag extension 54 is supported by the first airbag 24 in the inflated position and abuts the second airbag 26 in the inflated position. The assembly includes a tether 30 extending from the first airbag 24 to the second airbag 26. The tether 30 abuts the airbag extension 54. The airbag extension 54 is between the tether 30 and the second end 22 of the bed 14.

In the event of an impact to the vehicle 12, the first airbag 24 and the second airbag 26 inflate from an uninflated position (FIGS. 1 and 5-6) to the inflated position (FIGS. 2-4) to control the kinematics of an occupant on the bed 14. Specifically, the occupant is on the bed 14 between the first airbag 24 and the second airbag 26 and the first airbag 24 and second airbag 26 inflate on opposing sides of the occupant. The airbag extension 54 is supported by the first airbag 24 and abuts the second airbag 26 to control the kinematics of the occupant. For example, the airbag extension 54 may maintain the position of the occupant between the first airbag 24 and the second airbag 26. The extension of the tether 30 from the first airbag 24 to the second airbag 26 may retain position of the first airbag 24 and the second airbag 26 relative to each other. Since the tether 30 abuts the airbag extension 54, the tether 30 positions the airbag extension 54 relative to the first airbag 24 and/or the second airbag 26 and may maintain the position of the airbag extension 54 and the occupant relative to each other.

The vehicle 12 may be any suitable type of ground vehicle, e.g., a passenger or commercial automobile such as a sedan, a coupe, a truck, a sport utility, a crossover, a van, a minivan, a taxi, a bus, etc.

The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle 12 includes at least one bed assembly 32. The bed assembly 32 includes at least one bed 14 and at least one airbag assembly 34. The bed 14 may include a base 36 supported on a floor 38 of the vehicle 12. In example including more than one bed 14, the bed assembly 32 may include a divider 40 between the beds 14, 42. In the example shown in the figures, the vehicle 12 includes one bed assembly 32 that includes two beds 14, 42 on the base 36.

The base 36 may be fixed to the floor 38, e.g., fastened to the floor 38. The base 36 may be unitary with the rest of the bed 14 or components of the bed 14 may be separate from the base 36 and supported on the base 36. The base 36 may be upholstered to match the rest of the bed 14.

In examples including the divider 40 between the beds 14, 42, the divider 40 may extend upwardly relative to the beds 14, 42 to horizontally separate the beds 14, 42 from each other. The divider 40 may be unitary with the bed 14, e.g., the base 36, or may be separate from the bed 14 and supported on the bed 14. In such examples, the divider 40 may be unitary with the beds 14, 42 or separate from and adjacent to the beds 14, 42. The divider 40 may be upholstered to match the beds 14, 42 or may include a rigid surface, e.g., to support personal belongings of the occupant including food, drink, personal electronic devices, etc. The divider 40 may include a class-A surfaces, i.e., a finished surface exposed to view by a customer and free of unaesthetic blemishes and defects.

As set forth above, the bed assembly 32 includes at least one bed 14. In the example shown in the figures, the vehicle 12 includes two beds 14, 42, namely a first bed 14 and a second bed 42. In other examples, the vehicle 12 may include any number of beds 14, 42, i.e., one or more. In examples including more than one bed 14, the beds 14, 42 may be similar or identical to each other. In the example shown in the figures, the first bed 14 and the second bed 42 have common features and the common features are identified with common numerals for the first bed 14 and the second bed 42.

As set forth above, the beds 14, 42 are supported by the floor 38 of the vehicle 12. The beds 14, 42 may be arranged in any suitable arrangement in the passenger compartment. As in the example shown in the figures, one or more of the beds 14, 42 may be at the front end of the passenger compartment. In other examples, one or more of the beds 14, 42 may be behind the front end of the passenger compartment, e.g., at the rear end of the passenger compartment. The beds 14, 42 may be movable relative to the floor 38 of the vehicle 12 to various positions, e.g., movable fore-and-aft and/or cross-vehicle. The beds 14, 42 may be of any suitable type, e.g., a bucket seat, a bench seat, etc.

The bed 14 is shown reclined relative to the floor 38 in the example shown in the figures. While all modern OEMs of passenger vehicles currently warn occupants against not sitting upright in a moving vehicle 12 due to safety concerns, it is anticipated that technology and the regulatory framework may evolve in the future to where such an activity is safe and permissible and the figures show one such example.

In a reclined position, an occupant may lie comfortably stretched out on the bed 14. As set forth above, the bed 14 in the reclined position is elongated along the axis A. In examples including more than one bed 14, the axes A of the beds 14, 42 may be parallel in the reclined positions, e.g., as shown with the first bed 14 and the second bed 42 in the example in the figures. In the examples shown in the figures, the first bed 14 is elongated along the axis A and the second bed 42 is elongated along a second axis A.

The bed 14 include an occupant support surface 44. The occupant may be disposed on the occupant support surface 44. The occupant support surface 44 is generally horizontal when the bed 14 is reclined. The occupant support surface 44 in the reclined position may include a ramped portion, as shown in the example in the figures, to support the shoulders and/or head of the occupant in the reclined position.

In some examples, the bed 14 may be stationary in the reclined position. In some examples, the bed 14 may be a convertible seat that can convert between being a vehicle seat and the vehicle bed. In such examples, the bed 14 may include a seatback and a seat bottom and, in such examples, the seatback may be supported by the seat bottom and may be movable relative to the seat bottom. Specifically, the seatback may be pivotable relative to the seat bottom to the reclined position. In examples in which the seatback is pivotable, the seatback may be pivotable relative to the seat bottom to a plurality of angular positions including the reclined position. For example, the seatback may be pivotable relative to the seat bottom to an upright position, the reclined position, and positions therebetween. The seatback may be pivotable relative to the seat bottom and releasably fixed relative to the seat bottom in any suitable way and with any suitable reclining mechanism, including known reclining mechanisms. In the reclined position, the seatback may be parallel to the seat bottom and/or parallel to the floor 38 of the vehicle 12. For example, the seatback and the seat bottom may, in combination, form the occupant support surface 44.

The bed 14 includes a bed frame (not identified in the figures) and a covering (not numbered) supported on the bed frame. The bed frame may include tubes, beams, etc. The bed frame may be of any suitable plastic material, e.g., carbon fiber reinforced plastic (CFRP), glass fiber-reinforced semi-finished thermoplastic composite (organosheet), etc. As another example, some or all components of the bed frame may be formed of a suitable metal, e.g., steel, aluminum, etc.

The bed 14 includes the covering supported by the bed frame. The covering may be cloth, leather, faux leather, or any other suitable material. The covering may have a class-A surface, i.e., a finished surface exposed to view by a customer and free of unaesthetic blemishes and defects. The bed 14 may include padding material between the covering and the bed frame. The padding material may be foam or any other suitable material. The covering may be stitched in panels around the bed frame and padding material. As described further below, the bed 14, e.g., the covering, may include one or more tear seams through which the airbag assembly 34 is deployable.

The bed 14 includes two sides. Specifically, the bed 14 includes the first side 16 and the second side 18. The first side 16 and the second side 18 are opposite to each other about the axis A of the bed 14, i.e., the axis A is between the first side 16 and the second side 18. The bed 14 may terminate at the first side 16 and the second side 18. In examples including the divider 40, one of the sides of the bed 14 may be at the divider 40. For example, in the example shown in the figures, the second side 18 of the first bed 14 is at the divider 40 and first side 16 of the second bed 42 is at the divider 40. The first side 16 and the second side 18 may support an occupant laterally relative to the bed 14, e.g., the first side 16 and the second side 18 may include bolsters. The occupant support surface 44 is between the first side 16 and the second side 18.

The bed 14 includes the first end 20 and the second end 22. The second end 22 is spaced from the first end 20 along the axis A. The first end 20 and the second end 22 each extend from the first side 16 to the second side 18. The bed 14 may terminate at the first end 20 and the second end 22. When an occupant is on the bed 14, one of the first end 20 and the second end 22 is adjacent the head of the occupant and the other of the first end 20 and the second end 22 is adjacent the feet of the occupant. The occupant support surface 44 is between the first end 20 and the second end 22.

As set forth above, the bed assembly 32 includes at least one airbag assembly 34. In the example shown in the figures, the airbag assembly 34 is inflatable to surround the occupant support surfaces 44 of the first bed 14 and the second bed 42, as described further below. Specifically, the airbag assembly 34 may include a plurality of airbags 24, 26, 28 with one airbag elongated along the axis A at the first side 16 of the bed 14 when inflated and another airbag elongated along the axis A at the second side 18 of the bed 14 when inflated with the occupant support surface 44 between the airbags 24, 26, 28. The airbag assembly 34 includes at least one inflator 50 that inflates the airbags 24, 26, 28 with inflation medium, as described further below.

In the example shown in the figures, the airbag assembly 34 includes three airbags 24, 26, 28, namely the first airbag 24, the second airbag 26, and a third airbag 28. In such an example, the first airbag 24 is elongated along the axis A at the first side 16 of the first bed 14 when inflated and the second airbag 26 is elongated along the axis A at the second side 18 of the first bed 14 when inflated with the occupant support surface 44 of the first bed 14 between the first airbag 24 and the second airbag 26. Also, the second airbag 26 is elongated along the first side 16 of the second bed 42 when inflated and the third airbag 28 is elongated along the second side 18 of the second bed 42 when inflated with the occupant support surface 44 of the second bed 42 between the second airbag 26 and the third airbag 28. Specifically, in the example shown in the figures, the second airbag 26 is supported by the divider 40. Accordingly, the second airbag 26 is elongated along both the second side 18 of the first bed 14 and the first side 16 of the second bed 42. In such an example, the second airbag 26 controls the kinematics of the occupant of the first bed 14 and the occupant of the second bed 42. As set forth above, the bed assembly 32 includes one airbag assembly 34 including three airbags 24, 26, 28 in the example shown in the figures. As another example, the bed assembly 32 may include one airbag assembly 34 for the first bed 14 and another airbag assembly 34 for the second bed 42.

The airbags 24, 26, 28 are supported by the beds 14, 42 and/or divider 40 in the uninflated position and the inflated position. In the example shown in the figures, the first airbag 24 is under the covering of the first bed 14, e.g. mounted to the frame of the first bed 14 below the covering of the first bed 14, the third airbag 28 is under the covering of the second bed 42, e.g., mounted to the frame of the second bed 42 below the covering of the second bed 42, and the second airbag 26 is mounted to the divider 40, e.g., under a class-A surface. The airbags 24, 26, 28 may be rolled or otherwise packaged in the bed 14 and/or divider 40 in the uninflated position and may break through tear seams in the beds 14, 42 and/or divider 40 to the inflated position. The airbags 24, 26, 28 may be anchored to the bed 14 and/or divider 40, e.g., with fasteners.

In the inflated positions, the airbags 24, 26, 28, e.g., the first airbag 24, the second airbag 26, and the third airbag 28, are elongated along the axis A of the bed 14. In other words, the longest dimension of the airbag 24, 26, 28 is along the axis A of the bed 14. The longest dimension of the airbag 24, 26, 28 may be designed to extend along the entire occupant support surface 44, i.e., along an entire occupant in the reclined position. As an example, the first airbag 24 may extend from the first end 20 of the first bed 14 to the second end 22 of the first bed 14; the third airbag 28 may extend from the first end 20 of the second bed 42 to the first end 20 of the second bed 42; and the second airbag 26 may extend from the first ends 20 of first bed 14 and the second bed 42 to the second ends 22 of the first bed 14 and the second bed 42.

The airbag assembly 34 includes at least one airbag extension 54, 56, 58, 60. The airbag extension 54, 56, 58, 60 is supported by one of the airbags 24, 26, 28. In the example shown in the figures, the airbag assembly 34 includes two airbag extensions 54, 56 supported on the first airbag 24 and two airbag extensions 58, 60 supported on the third airbag 28. The airbag extensions 54, 56, 58, 60 may be at the first end 20 and the second end 22 of the bed 14, respectively, to control the kinematics of the occupant at the first end 20 and the second end 22 of the bed 14. Specifically, a first airbag extension 54 is supported by the first airbag 24 at the first end 20, a second airbag extension 56 is supported by the first airbag 24 at the second end 22, a third airbag extension 58 is supported by the third airbag 28 at the first end 20, and a fourth airbag extension 60 is supported by the fourth airbag at the second end 22.

The airbag extensions 54, 56, 58, 60 extend cross-bed, e.g., cross-vehicle, from one of the airbags 24, 26, 28 to the other of the airbags 24, 26, 28. In the example shown in the figures, the first airbag extension 54 and the second airbag extension 56 extend from the first airbag 24 to the second airbag 26 in the inflated position. Specifically, the first airbag extension 54 and the second airbag extension 56 abut the second airbag 26 in the inflated position. The third airbag extension 58 and the fourth airbag extension 60 extend from the third airbag 28 to the second airbag 26 in the inflated position. Specifically, the third airbag extension 58 and the fourth airbag extension 60 abut the second airbag 26 in the inflated position. In such an example, the first airbag extension 54 and the second airbag extension 56 are spaced from each other along the axis A and the third airbag extension 58 and the fourth airbag extension 60 are spaced from each other along the axis A.

The first airbag extension 54 and the third airbag extension 58 may be aligned with each other along the axis A and the second airbag extension 56 and the fourth airbag extension 60 may be aligned with each other along the axis A, as shown in the example in the figures. In such an example, the first airbag extension 54 and the third airbag extension 58 trap the second airbag 26 therebetween and act as reaction surfaces for each other. Similarly, the second airbag extension 56 and the fourth airbag extension 60 trap the second airbag 26 therebetween and act as reaction surfaces for each other. As another example, one or more of these airbag extensions 54, 56, 58, 60 may be supported by the second airbag 26 and may extend from the second airbag 26 to one of the first airbag 24 and the third airbag 28.

The airbag extension 54, 56, 58, 60 may be inflated through the airbag 24, 26, 28 on which the airbag extension 54, 56, 58, 60 is supported. In other words, the inflator 50 inflates the airbag 24, 26, 28 to the inflated position with inflation medium and the inflation medium flows through the airbag 24, 26, 28 to the airbag extension 54, 56, 58, 60 to inflate the airbag extension 54, 56, 58, 60 to the inflated position. Specifically, the airbag extensions 54, 56, 58, 60 may share an inflation chamber 62 with the airbag 24, 26, 28 on which the airbag extension 54, 56, 58, 60 is supported. For example, the first airbag 24 has an inflation chamber 62 and the first airbag extension 54 and second airbag extension 56 each have an inflation chamber 62 open to the inflation chamber 62 of the first airbag 24. Similarly, the third airbag 28 has an inflation chamber 62 and the third airbag extension 58 and fourth airbag extension 60 each have an inflation chamber 62 open to the inflation chamber 62 of the third airbag 28.

As set forth above, the airbag assembly 34 includes at least one inflator 50 to inflate the airbags 24, 26, 28. In the example shown in the figures, one inflator 50 is in fluid communication, e.g., with fill tubes, with each of the first airbag 24, the second airbag 26, and the third airbag 28. In other examples, any suitable number of inflators 50 may be in fluid communication with any suitable number of the airbags 24, 26, 28. The inflator 50 expands the airbag 24, 26, 28 with inflation medium, such as a gas, to move the airbag 24, 26, 28 from the uninflated position to the inflated position. The inflator 50 may be, for example, a pyrotechnic inflator 50 that ignites a chemical reaction to generate the inflation medium, a stored gas inflator 50 that releases (e.g., by a pyrotechnic valve) stored gas as the inflation medium, or a hybrid.

The airbag 24, 26, 28 and airbag extensions 54, 56, 58, 60 may be fabric, e.g., a woven polymer. For example, the fabric may be woven nylon yarn, for example, nylon. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag assembly 34 includes one or more tethers 30 extending cross-bed from one of the airbags 24, 26, 28 to another of the airbags 24, 26, 28 and along the airbag extension 54, 56, 58, 60 to maintain the position of the airbag extension 54, 56, 58, 60 relative to the airbags 24, 26, 28. One example of tethers 30 is shown in FIG. 2 and another example of tethers 30 is shown in FIG. 4.

Figure 2:
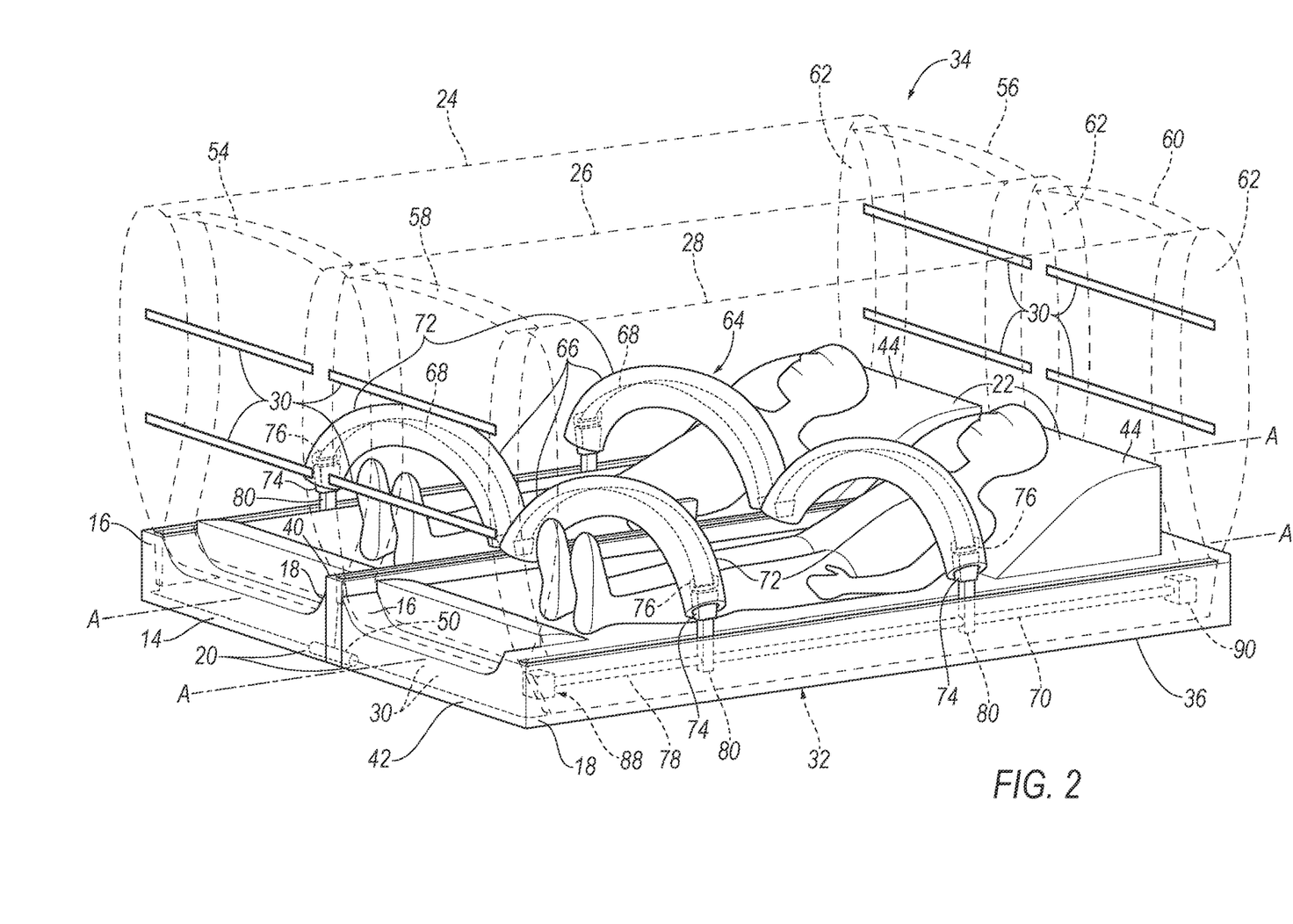
FIG. 2 is a perspective view of the vehicle beds with airbag assembly inflated.

In the example shown in FIG. 2, the airbag assembly 34 includes eight tethers 30. Specifically, two tethers 30 extend from the first airbag 24 to the second airbag 26 along the first airbag extension 54 at the first end 20 of the first bed 14; two tethers 30 extend from the first airbag 24 to the second airbag 26 along the second airbag extension 56 at the second end 22 of the first bed 14; two tethers 30 extend from the third airbag 28 to the second airbag 26 along the third airbag extension 58 at the first end 20 of the second bed 42; and two tethers 30 extend from the first airbag 24 to the third airbag 28 to the second airbag 26 along the fourth airbag extension 60 at the second end 22 of the second bed 42. In such an example, the tethers 30 along the first airbag extension 54 are connected to the first airbag 24 and the second airbag 26 in the uninflated position and the inflated position with the first airbag extension 54 being between those tethers 30 and the occupant support surface 44 of the first bed 14; the tethers 30 along the second airbag extension 56 are connected to the first airbag 24 and the second airbag 26 in the uninflated and inflated position with the second airbag extension 56 being between those tethers 30 and the occupant support surface 44 of the first bed 14; the tethers 30 along the third airbag extension 58 are connected to the second airbag 26 and the third airbag 28 in the uninflated and inflated position with the third airbag extension 58 being between those tethers 30 and the occupant support surface 44 of the second bed 42; and the tethers 30 along the fourth airbag extension 60 are connected to the second airbag 26 and the third airbag 28 in the uninflated and inflated position with the fourth airbag extension 60 being between those tethers 30 and the occupant support surface 44 of the second bed 42. The tethers 30 are connected to the respective airbag 24, 26, 28 in that the tethers 30 are fixed relative to the respective airbags 24, 26, 28 in the uninflated position and the inflated position and controls the position of the respective airbag extension 54, 56, 58, 60 in the inflated position. The tethers 30 may be connected to the respective airbags 24, 26, 28 in any suitable way, e.g., sewn to, adhered to, welded to, etc. In the example shown in FIG. 2, the airbag assembly 34 may include any suitable number of tethers 30, i.e., one or more, extending between the respective airbags 24, 26, 28.

Figure 4:
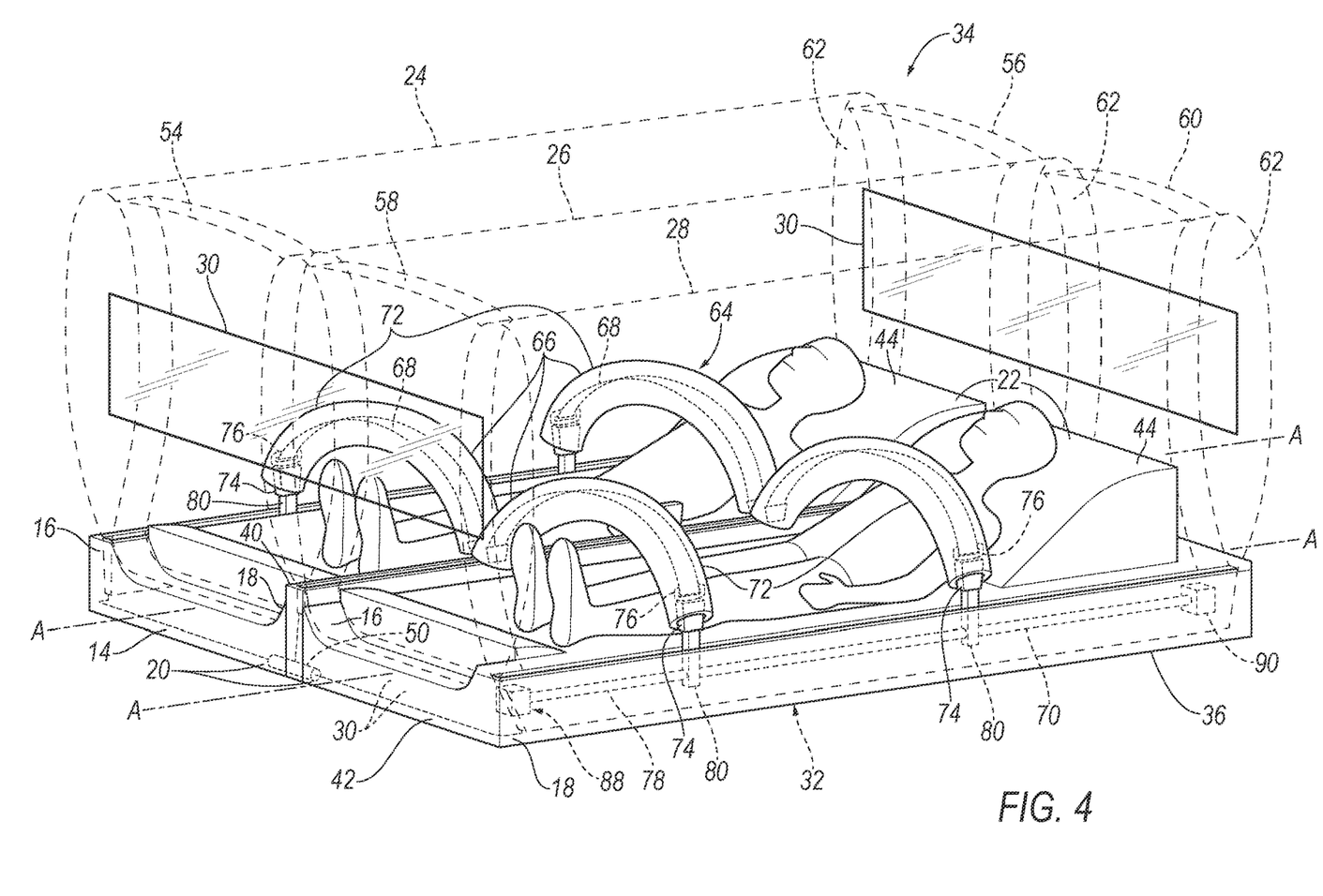
FIG. 4 is a perspective view of the vehicle beds with another example of the airbag assembly inflated.

In the example shown in FIG. 4, the airbag assembly 34 includes two tethers 30. Specifically, one tether 30 at the first end 20 of the beds 14, 42 and one tether 30 at the second end 22 of the beds 14, 42. Each of the tethers 30 are connected to the first airbag 24 and the third airbag 28. The tether 30 at the first end 20 of the beds 14, 42 extend across the first airbag extension 54 and the third airbag extension 58 to control the position of the first airbag extension 54 and the third airbag extension 58 relative to the first airbag 24, the second airbag 26, and the third airbag 28. The tether 30 at the second end 22 of the beds 14, 42 extend across the second airbag extension 56 and the fourth airbag extension 60 to control position of the second airbag extension 56 and the fourth airbag extension 60 relative to the first airbag 24, the second airbag 26, and the third airbag 28. In the example shown in the figures, the tethers 30 at the first end 20 and/or the second end 22 may be connected to the second airbag 26 or may abut the second airbag 26 without being connected to the second airbag 26.

Figure 5:
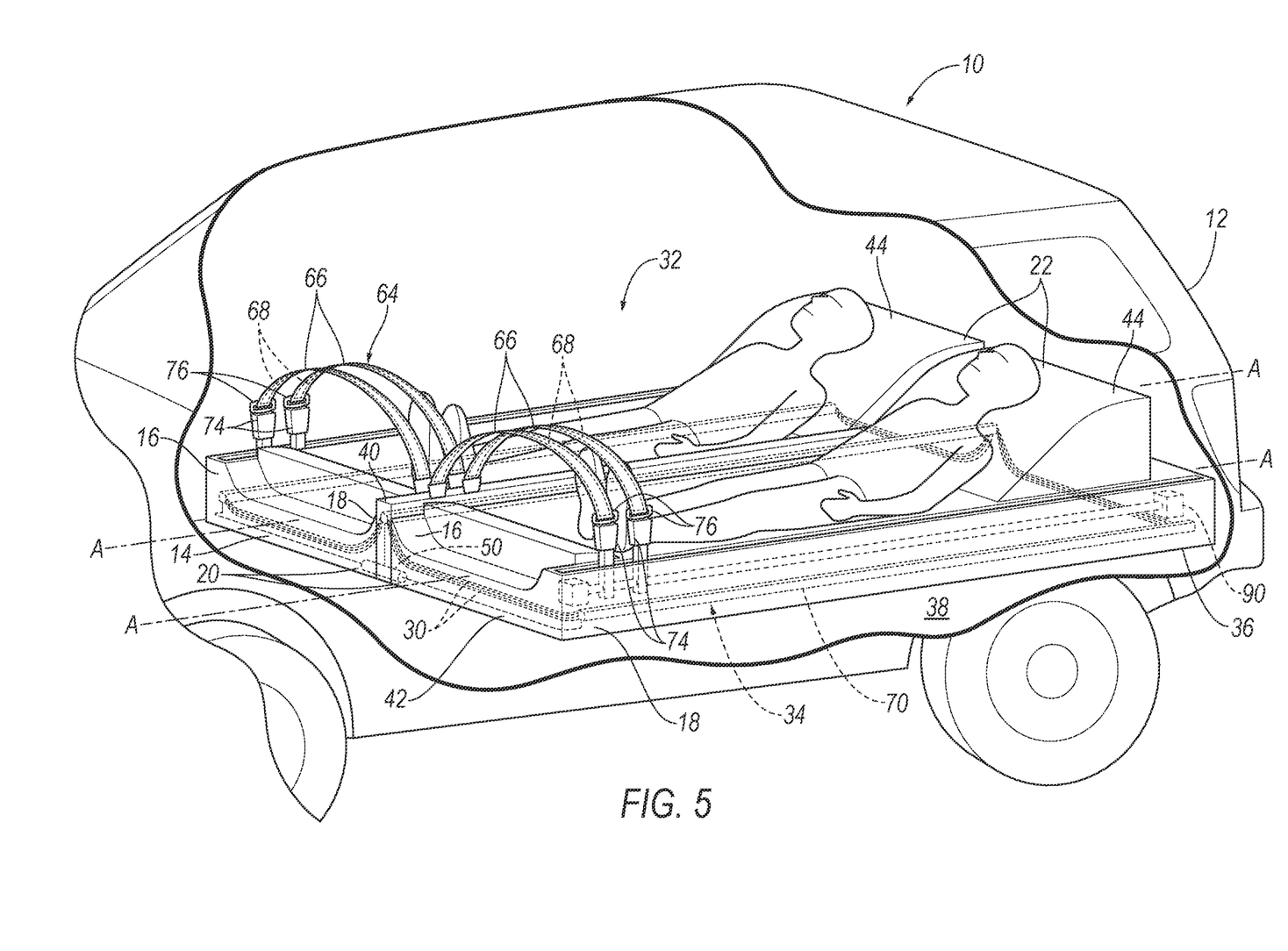
FIG. 5 is a perspective view of the vehicle with components of a belt restraint assembly shown in broken lines and with the belt restraint assembly in a stowed position.

The bed assembly 32 includes at least one belt restraint assembly 64. In the example shown in the figures, the belt restraint assembly 64 includes two belt restraints 66 on the first bed 14 and two belt restraints 66 on the second bed 42. The belt restraint assembly 64 includes webbing 68 that is moveable along the axis A of the bed 14, i.e., along the occupant support surface 44. For example, the bed 14 may include tracks 70 that slideably receive the webbing 68 and the webbing 68 may be moveable relative to the bed 14 in the tracks 70. Specifically, the webbing 68 may move from a stowed position, as shown in FIG. 5 to a deployed position, as shown in broken lines in FIG. 6. This allows for ingress and egress in the stowed position. The webbing 68 may be moveable manually by the occupant of the bed 14. As another example, the webbing 68 may be moveable automatically, as shown in the figures and described further below.

Figure 1:
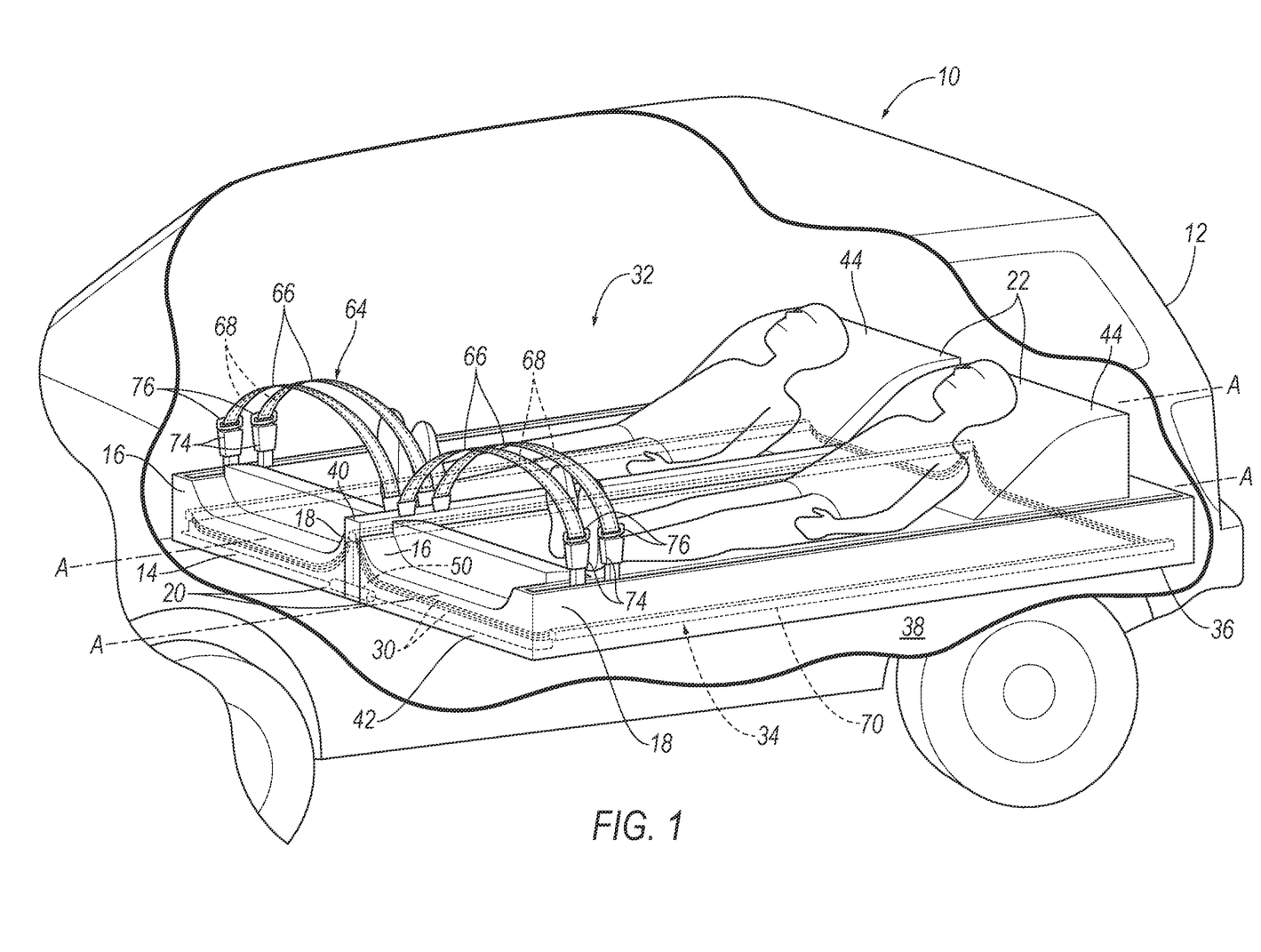
Figure 3:
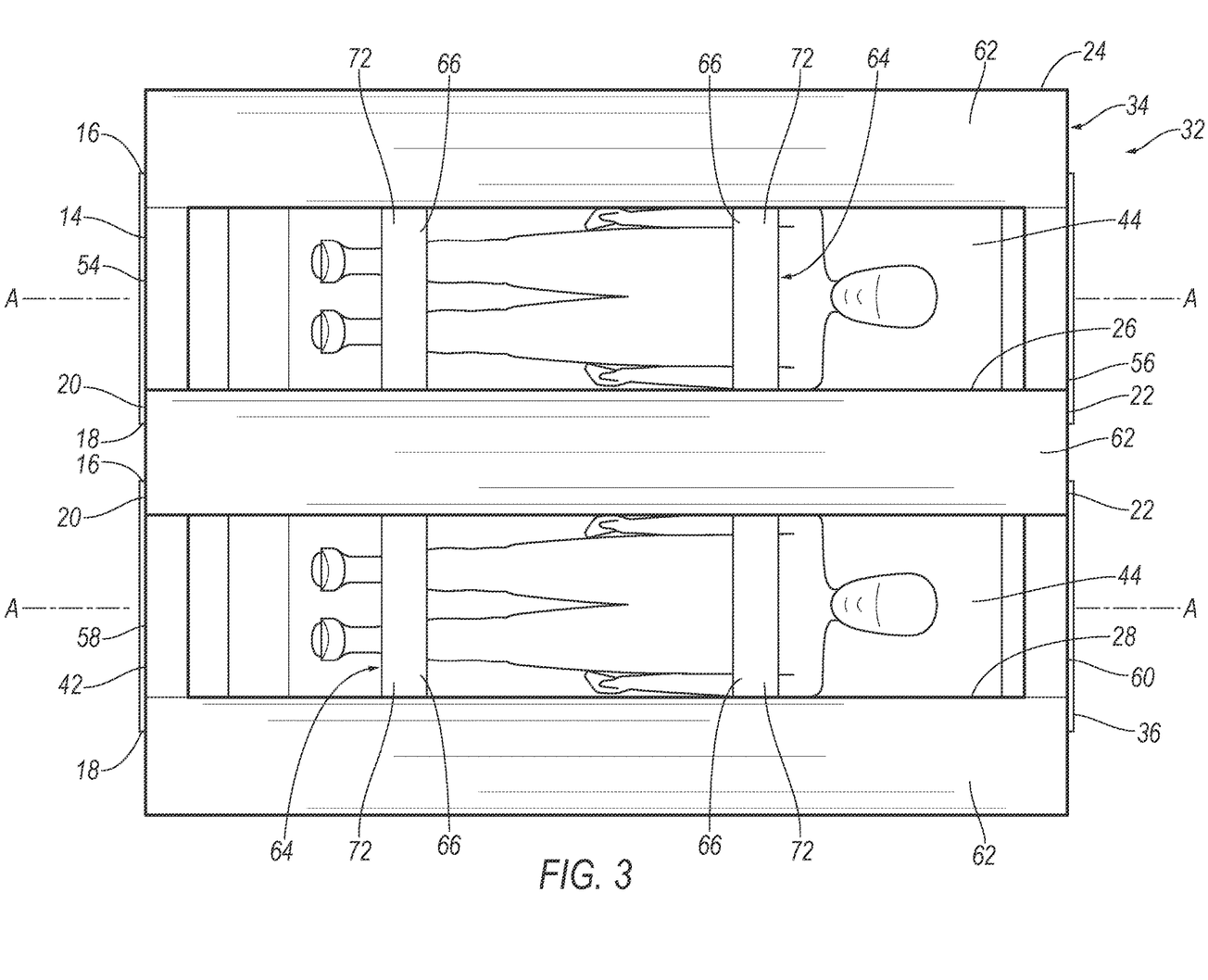
FIG. 3 is a top view of the vehicle beds with the airbag assembly inflated.
Figure 6:
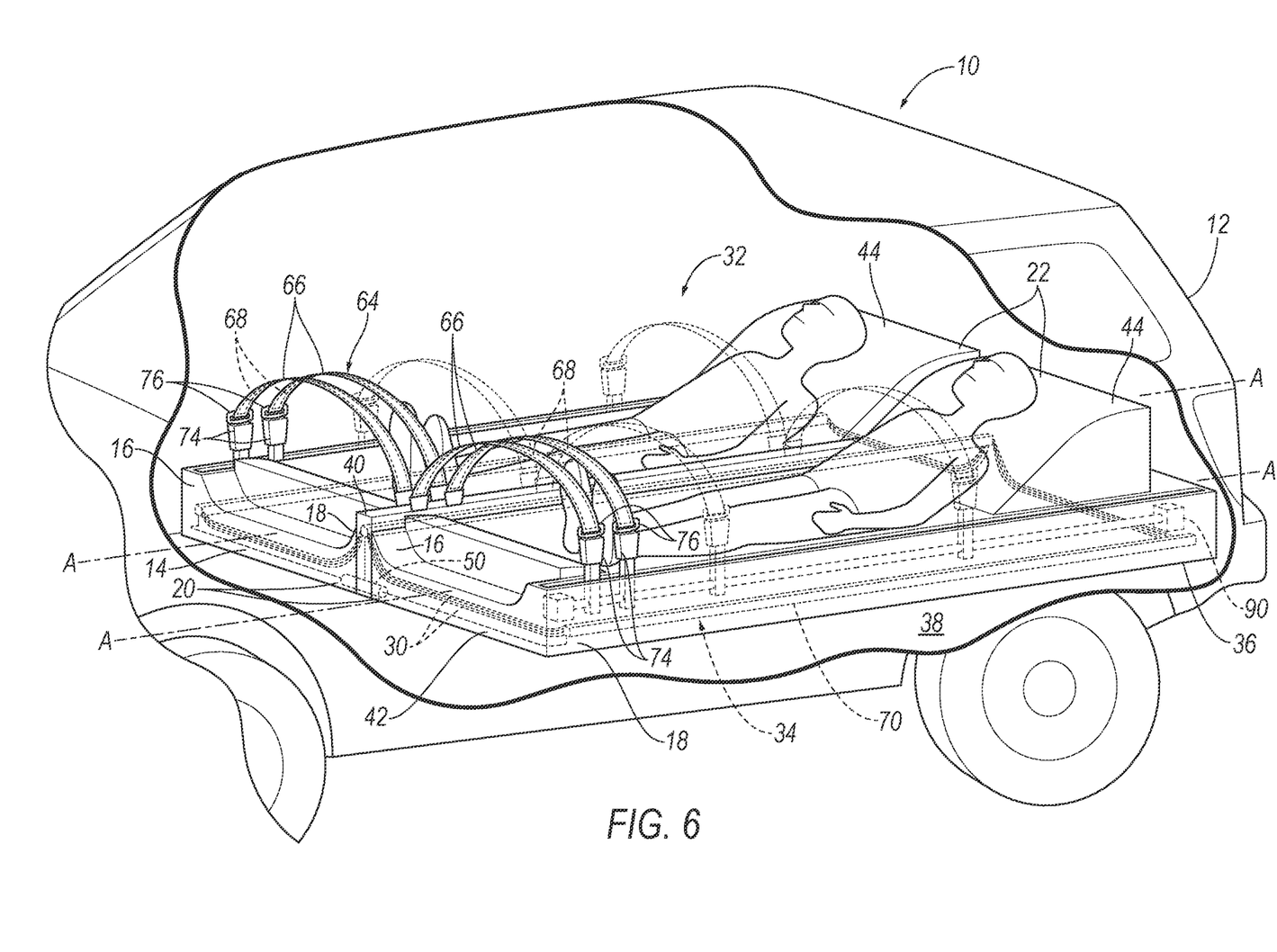
FIG. 6 is a perspective view of the vehicle with the belt restraint assembly in a deployed position in broken lines.

The webbing 68 is inflatable from an uninflated position, as shown in FIGS. 1, 5, and 6, to an inflated position, as shown in FIGS. 2-4. In the inflated position, the webbing 68 is inflated with inflation medium and the size of the webbing 68 is increased relative to the uninflated position. Specifically, the webbing 68 includes an inflation chamber 72 that is inflated by inflation medium. The webbing 68 may be in fluid communication with the inflator(s) 50 that inflates the airbags 24, 26, 28 or the belt restraint assembly 64 may include a separate inflator (not shown) that inflates the webbing 68. The webbing 68 may be in fluid communication with the respective inflator 50 with, for example, fill tubes that move with the webbing 68 as the webbing 68 moves relative to the bed 14.

Whether the webbing 68 is manually moveable relative to the bed 14 or automatically moveable relative to the bed 14, the belt restraint assembly 64 may include a buckle 74 mounted to the bed 14 and a clip 76 on the webbing 68 that is releasably engageable with the buckle 74. Specifically, the buckle 74 is slideably engaged with the bed 14 to move relative to the bed 14 along the axis A. In the examples shown in the figures, the belt restraint assembly 64 includes clips 76 on the webbing 68 and the clips 76 are engaged with the buckles 74. In such examples, the belt restraint assembly 64 includes an anchor (not identified) on the other side of the webbing 68 and slideably engaged with the bed 14. In the example shown in the figures, merely by way of example, the anchors are slideably engaged with the divider 40 and the buckles 74 are slideably engaged with outboard sides of the beds 14, 42, namely, the first side 16 of the first bed 14 and the second side 18 of the second bed 42. The components of the buckle 74 and the clips 76 that releasably engage each other may be of the type known in the art, e.g., as used in seatbelts.

The bed assembly 32 may include a drive mechanism 88 that automatically moves the webbing 68 relative to the bed 14. In the example shown in the figures, the bed assembly 32 includes two drive mechanisms 88. Specifically, as an example, one drive mechanism 88 is on the first side 16 of the first bed 14 and one drive mechanism 88 is on the second side 18 of the second bed 42. In such an example, the other side of the webbing 68 may be passively slideably engaged with the bed 14 and may be pulled by the drive mechanism 88, e.g., the webbing 68 may be passively slideably engaged with the divider 40 between the beds 14, 42 and the webbing 68 may be positioned along the bed 14 with the drive mechanism 88 at the first side 16 of the first bed 14 or second side 18 of the second bed 42. As another example, the bed assembly 32 may include one or more drive mechanism 88 at the divider 40 and/or the webbing 68 may be passively slideably engaged with the first side 16 of the first bed 14 or the second side 18 of the second bed 42.

As shown in the example in the figures, the drive mechanism 88 may include a lead screw 78 and a carriage 80 that rides on the lead screw 78 and is fixed to the webbing 68, e.g., through the buckle 74 and clip 76 in the example shown in the figures. Specifically, the carriage 80 is threadedly engaged with the lead screw 78 and moves linearly relative to the bed 14 as the lead screw 78 rotates. The drive mechanism 88 may include an electric motor 90 engaged with the lead screw 78. The electric motor 90 rotates the lead screw 78 to move the carriage 80 relative to the bed 14. The drive mechanism 88 may be in communication with an occupancy sensor 92 identifying occupancy of the bed 14. Specifically, a computer 82 of the vehicle 12, e.g., a restraints control module, may control the motor based on the occupancy sensor 92. In examples that include more than one belt restraint 66 on one drive mechanism 88, one or more of the carriages 80 may include a clutch that releases from the lead screw 78 when the carriage 80 is in the deployed position. The clutch allows the carriages 80 to move to different positions along the axis A.

The belt restraint assembly 64 is designed to be moveable along the axis A of the bed 14 without interference from appendages of the occupant. In the example shown in the figures, the carriage 80 may be extended upwardly from the lead screw 78 to position the webbing 68 above the occupant support surface 44. In addition or in the alternative, the webbing 68 may have a shape memory, e.g., with a shape memory material embedded in the webbing 68, that arcs the webbing 68 over appendages of the occupant.

In operation, the belt restraint assemblies 64 are in the stowed position when the bed 14 is unoccupied. When an occupant lies down on the bed 14, the webbing 68 is moved to the deployed position, e.g., manually or automatically, as described above. In the absence of a vehicle 12 impact, the occupant may move the webbing 68 to the stowed position, e.g., based on input from operation of the vehicle 12 and/or from the occupant, so that the occupant may leave the bed 14. While the occupant is on the bed 14, the airbags 24, 26, 28 and the webbing 68 inflate in response to a detected vehicle 12 impact. When inflated, the airbags 24, 26, 28 surround the occupant support surface 44 to control the kinematics of the occupant. The webbing 68, when inflated, also controls the kinematics of the occupant. As set forth above, the airbag extensions 54, 56, 58, 60 extend cross-bed to control the kinematics of the occupant. The tethers 30 position the airbag extensions 54, 56, 58, 60 relative to the airbags 24, 26, 28 and also control the kinematics of the occupant.

Figure 7:
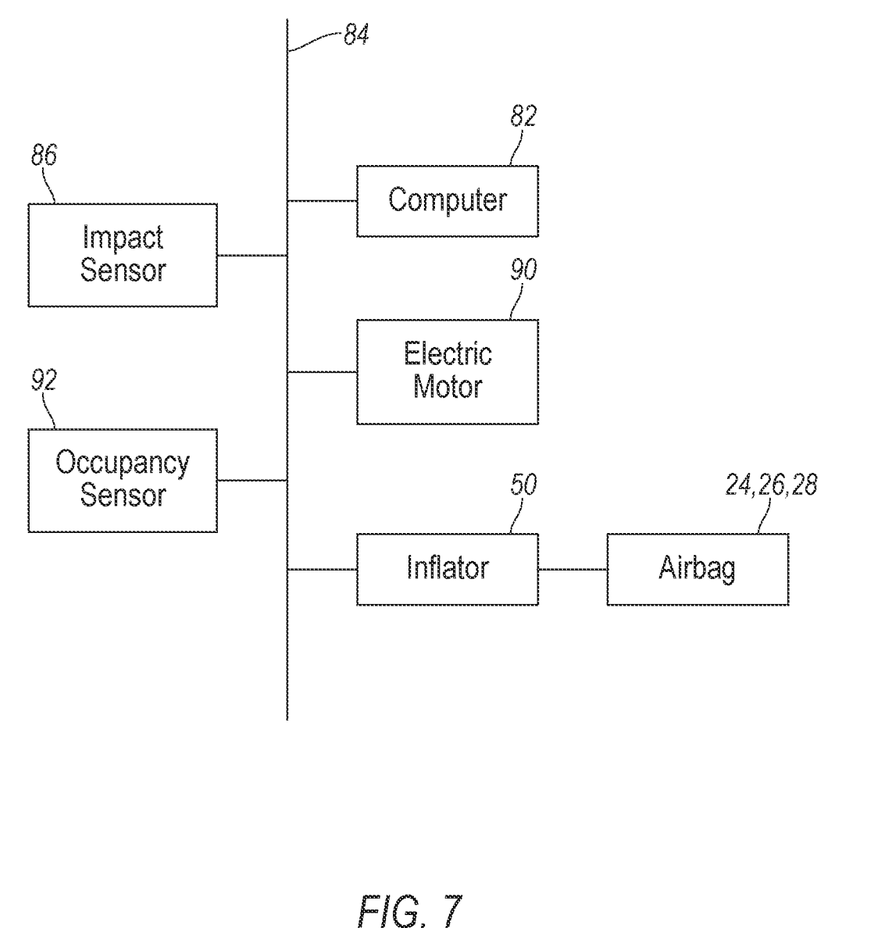
FIG. 7 is a block diagram of a system of the vehicle.

The computer 82, e.g., the restraints control module, includes a processor and a memory. The memory includes one or more forms of computer 82 readable media, and stores instructions executable by the processor for performing various operations, including as disclosed herein. For example, the computer 82 can be a generic computer 82 with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer 82 may include an FPGA (Field-Programmable Gate Array) which is an integrated circuit manufactured to be configurable by a user. Typically, a hardware description language such as VHDL (Very High Speed Integrated Circuit Hardware Description Language)

is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 82. The memory can be of any type, e.g., hard disk drives, solid state drives, servers, or any volatile or non-volatile media. The memory can store the collected data sent from the sensors. The memory can be a separate device from the computer 82, and the computer 82 can retrieve information stored by the memory via a network in the vehicle 12, e.g., over a CAN bus, a wireless network, etc. Alternatively or additionally, the memory can be part of the computer 82, e.g., as a memory of the computer 82. The computer 82 may include programming to operate one or more of vehicle 12 brakes, propulsion e.g., control of acceleration in the vehicle 12 by controlling one or more of an internal combustion engine, electric motor 90, hybrid engine, etc., steering, climate control, interior and/or exterior lights, etc., as well as to determine whether and when the computer 82, as opposed to a human operator, is to control such operations. Additionally, the computer 82 may be programmed to determine whether and when a human operator is to control such operations. The computer 82 may include or be communicatively coupled to, e.g., via a vehicle network such as a communications bus as described further below, more than one processor, e.g., included in components such as sensors, electronic control units (ECUs) or the like included in the vehicle 12 for monitoring and/or controlling various vehicle components, e.g., a powertrain controller, a brake controller, a steering controller, etc. As shown in FIG. 7, the computer 82 is generally arranged for communications on a vehicle communication network 84 that can include a bus in the vehicle 12 such as a controller area network CAN or the like, and/or other wired and/or wireless mechanisms. Alternatively or additionally, in cases where the computer 82 actually comprises a plurality of devices, the vehicle communication network 84 may be used for communications between devices represented as the computer 82 in this disclosure. Further, as mentioned below, various controllers and/or sensors may provide data to the computer 82 via the vehicle communication network 84.

The vehicle 12 may include at least one impact sensor 86 for sensing impact of the vehicle 12, and the computer 82 in communication with the impact sensor 86. Alternatively or additionally to sensing impact, the impact sensor 86 may be configured to sense impact prior to impact, i.e., pre impact sensing. The impact sensor 86 is configured to detect an impact to the vehicle 12. The impact sensor 86 may be of any suitable type, for example, post contact sensors such as accelerometers, pressure sensors, and contact switches; and pre impact sensors 86 such as radar, LIDAR, and vision sensing systems. The vision sensing systems may include one or more cameras, CCD image sensors, CMOS image sensors, etc. The impact sensor 86 may be located at numerous points in or on the vehicle 12.

The numerical adjectives, e.g., "first," "second," "third," and "fourth," are used herein merely as identifiers and do not signify order or importance. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a vehicle bed elongated along an axis, the vehicle bed including a first side and a second side with the axis between the first side and the second side, the vehicle bed having a first end and a second end spaced from each other along the axis;
   a first airbag elongated along the axis on the first side of the vehicle bed and inflatable to an inflated position;
   a second airbag elongated along the axis on the second side of the vehicle bed and inflatable to an inflated position;
   an airbag extension supported by the first airbag in the inflated position and abutting the second airbag in the inflated position; and
   a tether extending from the first airbag to the second airbag, the tether abutting the airbag extension, the airbag extension being between the tether and the second end of the vehicle bed.

2. The assembly of claim 1, wherein the first airbag has an inflation chamber and the airbag extension has an inflation chamber open to the inflation chamber of the first airbag.

3. The assembly of claim 1, wherein the tether is connected to the first airbag and the second airbag.

4. The assembly of claim 1, further comprising a second airbag extension supported by the first airbag in the inflated position and abutting the second airbag in the inflated position, the second airbag extension being spaced from the airbag extension along the axis.

5. The assembly of claim 4, further comprising a second tether extending from the first airbag to the second airbag, the second airbag extension being between the second tether and the first end of the vehicle bed.

6. The assembly of claim 5, wherein the first airbag has an inflation chamber, the airbag extension has an inflation chamber open to the inflation chamber of the first airbag, and the second airbag extension has an inflation chamber open to the inflation chamber of the first airbag.

7. The assembly of claim 6, wherein the tether and the second tether are connected to the first airbag and the second airbag.

8. The assembly of claim 1, further comprising at least one belt restraint extendable from the first side of the vehicle bed to the second side of the vehicle bed.

9. The assembly of claim 1, further comprising a second vehicle bed elongated along a second axis, the second airbag being between the vehicle bed and the second vehicle bed.

10. The assembly of claim 9, further comprising a third airbag elongated along the second axis and inflatable to an inflated position, the second vehicle bed including a first side and a second side with the second axis between the first side of the second vehicle bed and the second side of the second vehicle bed.

11. The assembly of claim 10, wherein the second axis of the second vehicle bed is parallel to the axis of the vehicle bed.

12. The assembly of claim 10, further comprising:
    a third airbag extension supported by the third airbag in the inflated position and abutting the second airbag in the inflated position; and
    a third tether extending from the third airbag to the second airbag, the third tether abutting the third airbag extension;

the second vehicle bed having a first end and a second end spaced from each other along the second axis, the third airbag extension being between the third tether and the second end of the second vehicle bed.

13. The assembly of claim 12, further comprising:

a fourth airbag extension supported by the third airbag in the inflated position and abutting the second airbag in the inflated position, the fourth airbag extension being spaced from the third airbag extension along the second axis; and a fourth tether extending from the third airbag to the second airbag, the fourth airbag extension being between the fourth tether and the first end of the second vehicle bed.

14. The assembly of claim 13, further comprising:

a second airbag extension supported by the first airbag in the inflated position and abutting the second airbag in the inflated position, the second airbag extension being spaced from the airbag extension along the axis; and a second tether extending from the first airbag to the second airbag, the second airbag extension being between the second tether and the first end of the vehicle bed.

15. The assembly of claim 14, wherein:

the first airbag has an inflation chamber, the airbag extension has an inflation chamber open to the inflation chamber of the first airbag, and the second airbag extension has an inflation chamber open to the inflation chamber of the first airbag; and the third airbag has an inflation chamber, the third airbag extension has an inflation chamber open to the inflation chamber of the third airbag, and the fourth airbag extension has an inflation chamber open to the inflation chamber of the third airbag.

\* \* \* \* \*